(12) United States Patent
Eßer et al.

(10) Patent No.: US 11,892,161 B2
(45) Date of Patent: Feb. 6, 2024

(54) BURNER MODULE AND METHOD FOR THE ADDITIVE MANUFACTURE OF A BURNER MODULE OF THIS KIND

(71) Applicant: Linde GmbH, Pullach (DE)

(72) Inventors: Heinz-Dieter Eßer, Hürtgenwald (DE); Matthias Riecker, Olching (DE); Florian Lang, Dachau (DE); Fabian Neuner, Munich (DE)

(73) Assignee: Linde GmbH, Pullach (DE)

( * ) Notice: Subject to any disclaimer, the term of this patent is extended or adjusted under 35 U.S.C. 154(b) by 293 days.

(21) Appl. No.: 17/292,270

(22) PCT Filed: Nov. 6, 2019

(86) PCT No.: PCT/EP2019/025382
§ 371 (c)(1),
(2) Date: May 7, 2021

(87) PCT Pub. No.: WO2020/094254
PCT Pub. Date: May 14, 2020

(65) Prior Publication Data
US 2021/0404653 A1 Dec. 30, 2021

(30) Foreign Application Priority Data

Nov. 8, 2018 (EP) .................................... 18020585

(51) Int. Cl.
*F23D 14/02* (2006.01)
*F23D 14/04* (2006.01)
(Continued)

(52) U.S. Cl.
CPC .............. *F23D 14/02* (2013.01); *B22F 10/25* (2021.01); *B22F 10/28* (2021.01); *F23D 14/045* (2013.01);
(Continued)

(58) Field of Classification Search
CPC ............................. F23D 14/48; F23D 14/045
(Continued)

(56) References Cited

U.S. PATENT DOCUMENTS 3,121,457 A 2/1964 Whipple et al.
5,364,080 A 11/1994 Kraemer et al.
(Continued)

FOREIGN PATENT DOCUMENTS

CN 104132341 B 1/2017
CN 107023834 A 8/2017
(Continued)

*Primary Examiner* — Vivek K Shirsat
(74) *Attorney, Agent, or Firm* — Millen, White, Zelano & Branigan, P.C.; Brion P. Heaney

(57) ABSTRACT

A burner module according to the invention comprises at least three or four or five or six or seven or eight functional walls which delimit at least one first functional space and form a module body, wherein the module body has at least three or four or five or six or six or seven gas passage openings and at least two of these gas passage openings are connected to one another communicatively via the first functional space, and wherein at least one nozzle device having a fuel gas opening is formed in an upper wall of the burner module, which fuel gas opening is connected communicatively to the first functional space via a gas channel. The burner module is produced in an additive manner.

13 Claims, 1 Drawing Sheet

Figures 1, 2:
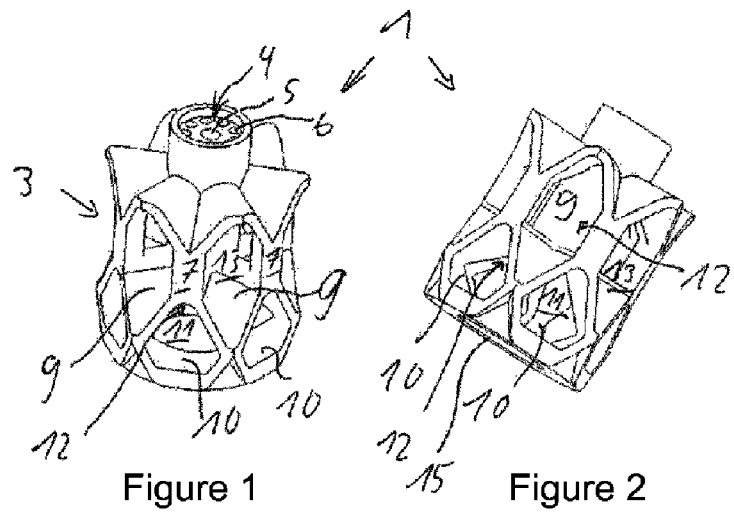

(51) Int. Cl.

| | |
|---|---|
| *F23D 14/52* | (2006.01) |
| *F23D 14/58* | (2006.01) |
| *F23D 14/78* | (2006.01) |
| *F23D 23/00* | (2006.01) |
| *B22F 10/25* | (2021.01) |
| *B22F 10/28* | (2021.01) |
| *B33Y 80/00* | (2015.01) |
| *B22F 10/32* | (2021.01) |
| *B22F 10/50* | (2021.01) |
| *B22F 10/62* | (2021.01) |

(52) U.S. Cl.
CPC .............. *F23D 14/52* (2013.01); *F23D 14/58* (2013.01); *F23D 14/78* (2013.01); *F23D 23/00* (2013.01); *B22F 10/32* (2021.01); *B22F 10/50* (2021.01); *B22F 10/62* (2021.01); *B33Y 80/00* (2014.12); *F23D 2213/00* (2013.01)

(58) Field of Classification Search
USPC .................................................. 431/286, 354
See application file for complete search history.

(56) References Cited

U.S. PATENT DOCUMENTS

| | | | | |
|---|---|---|---|---|
| 10,619,848 B2 * | 4/2020 | Tompkins | ................ | F23C 3/002 |
| 2021/0355878 A1 * | 11/2021 | Lundgren | ................ | F23D 14/78 |

FOREIGN PATENT DOCUMENTS

| | | | |
|---|---|---|---|
| DE | 2914292 A1 | 10/1980 | |
| EP | 0529310 A1 | 3/1993 | |
| JP | H0868512 A | 3/1996 | |

\* cited by examiner

BURNER MODULE AND METHOD FOR THE ADDITIVE MANUFACTURE OF A BURNER MODULE OF THIS KIND

The present invention relates to a burner module and a modular burner comprising a plurality of burner modules, and to a method for the additive manufacture of a burner module of this kind and of a modular burner of this kind.

By means of additive manufacturing methods, it is possible to produce a wide variety of three-dimensional components with complex geometry.

In 3D printing, for example, three-dimensional workpieces are constructed in layers. The construction is performed in a computer-controlled manner from one or more liquid or solid materials according to specified dimensions and shapes (CAD). Physical or chemical curing or melting processes take place during the construction. Typical materials for 3D printing are plastics, synthetic resins, ceramics, and metals. 3D printers are used in industry and research. There are also applications in the home and entertainment sector as well as in the arts.

3D printing is a generative or additive manufacturing method. The most important techniques of 3D printing are selective laser melting and electron beam melting for metals and selective laser sintering for polymers, ceramics, and metals.

A further additive method is punctiform melting and solidification. In such type of method, metal powder or metal wire is melted and solidified in layers so that a three-dimensional component can be generated. Due to the locally limited introduction of energy by means of a laser beam, the size of the formed molten pool is small. It is thus possible to produce filigree structures. Corresponding methods are sold commercially as laser engineered net shaping (LENS), direct metal deposition (DMD), laser additive manufacturing (LAM), selective laser melting (SLM), or laser metal deposition (LMD).

In the case of local laser sintering or melting, a distinction is made between indirect and direct methods.

Selective laser sintering (SLS) is a method for producing spatial structures from a pulverulent starting material by sintering. Laser sintering is an additive layer construction method. In this case, the workpiece is constructed layer by layer. As a result of the action of the laser beams, any three-dimensional geometries can thus be produced, even with undercuts, e.g., workpieces which cannot be produced in conventional mechanical or casting manufacturing.

In selective laser sintering (SLS/LMF), a layer of powder material is applied to a work surface (building platform). The loose powder is melted point by point by a laser beam. Depending on the material used, the powder particles are connected in the layer and with the underlying layer. Two fundamental development directions can be differentiated for the production of metallic components. In addition to the direct solidification of metallic powder materials by laser radiation (direct metal laser sintering), the production of metallic components via a combination of SLS of plastic-sheathed metal powder with subsequent thermal treatment (IMLS) was already established at an early stage.

In direct metal laser sintering (DMLS), either single-component or multi-component metal materials are used. DMLS multicomponent powders which consist of various alloy elements are in particular used in this case. The low-melting component contained in the powder is melted by a laser beam and encloses the high-melting component, which serves as a structure provider.

In electron beam melting (EBM), the process flow essentially corresponds to that of the laser-based methods. Loose metal powder, in the powder bed or via a nozzle, or wire is melted point by point and subsequently solidifies in the desired contour. The necessary energy for this purpose is introduced by an electron beam. The method is usually carried out in a vacuum chamber flooded with inert gas.

Accordingly, in additive manufacturing methods, a powder bed, a powder feed, or a wire feed is used, wherein such starting materials are then melted by means of a laser beam, electron beam, plasma arc/arc and subsequently solidified. Furthermore, inert or active gases are used as process gases in the additive manufacturing methods.

One objective of the aforementioned additive manufacturing methods is to ensure the most efficient possible introduction of energy so that a reliable production process and a high quality of the component are achieved.

In recent years, methods have been developed to improve the processing of one-component metal materials. Corresponding methods are sold commercially under the name selective laser melting (SLM), for example.

In these methods, attempts are made to reduce critical influences and processes during the introduction of energy by suitable measures. In this connection, the use of a substrate plate on which the component is fixed, the performance of the process under shielding gas atmosphere, or the application of new scan strategies for the exposure of the powder by means of laser energy are known.

A burner is a device for converting chemical energy into thermal energy. Burners can be designed for gaseous (e.g., propane, butane, or natural gas) or liquid (e.g., gasoline, diesel fuel, heating oil, kerosene, or petroleum) fuels. So-called two-component burners or blower burners are able to burn both liquid and gaseous fuels alternately or simultaneously. It is also possible to use solid (as fine-grained as possible) fuels. In the case of liquid fuel, the atomization is effected either by pressure relief or auxiliary media (e.g., air or vapor).

Burners are also differentiated by the type of flame. For example, there are turbulent diffusion flame (e.g., direct injection engine, jet engine, older oil heaters) and turbulent premix flame (e.g., Bunsen burner, gasoline engine with intake manifold injection, new oil heaters).

Another way of differentiating is the type of regulation. A distinction is made between single-stage burners (on/off control), two-stage or multi-stage burners and controllable burners which are operated in a continuously variable manner.

The type of fuel, the mixing of the reactants and the need for flame stabilization lead to a wide variety of burner designs, such as point, surface, or swirl burners.

Block burners are known in the field of gas burners. These comprise a distributor strip, on the upper side of which burner nozzles are screwed in. The distributor strip is usually a solid block of brass which is correspondingly machined by deep bores in different planes so that a uniform gas distribution over the entire burner is made possible. Additional media, such as cooling water or air, can also be integrated but additionally increase the degree of complexity of the planning and manufacture of such a burner head.

The object of the invention is to provide a variable and flexible burner which can also be produced cost-effectively and quickly.

A further object of the present invention is to efficiently produce a burner having predetermined characteristics and virtually any desired geometry.

In addition, it is an object of the present invention to provide a method for additive manufacture by means of which a burner with virtually any desired three-dimensional geometry can be produced in a simple manner.

These objects are achieved by the independent claims. Advantageous embodiments are specified in the dependent claims.

This object is achieved by providing a burner module for a modular burner. This burner module comprises at least three or four or five or six or seven or eight functional walls which delimit at least one first functional space and form a module body, wherein the module body has at least three or four or five or six or seven or eight gas passage openings, and at least two of these gas passage openings are connected to one another communicatively via the first functional space, and wherein at least one nozzle device having a fuel gas opening is formed in an upper wall of the burner module, which fuel gas opening is connected communicatively to the first functional space via a gas channel, wherein the burner module is manufactured in an additive manner.

A fuel gas or a fuel gas mixture can be fed to the nozzle opening via the gas channel.

Conventional burners, in particular block burners, are generally designed and produced in a customized manner with regard to their properties, such as length, width, and number of burners. A complex redesign of the gas channels is thus frequently also necessary. On the other hand, the manufacture, in particular of a distributor strip, is very complex since deep channels have to be drilled or milled from a solid material from different directions. This is time-consuming and expensive. Furthermore, the drilling openings must then be closed by soldering in plugs, which in turn means additional expenditure.

According to the invention, a burner module for forming a modular burner is now provided. Individual burner modules can simply be lined up in a CAD program. In this way, it is possible to realize any desired burner shapes and sizes in a customized manner.

A burner module or at least one of its functional walls can be connected to at least one partially complementary functional wall of a further burner module. The burner modules are thus designed in such a way that channels or chambers are formed by lining up multiple burner modules. Using the modular principle, the designer can design new burner modules or burner heads in a short time. Automation of this design process via parameterization of the modules or of the burner head is likewise possible. This shortens the design process to a few minutes.

Each of these burner modules already comprises at least one or more chambers or functional spaces for a fuel gas mixture and/or water cooling and/or passage openings or connection openings. These chambers are lined up with one another and are connected to one another in a gas-tight manner, as a result of which a complex design of distributing and cooling channels is no longer necessary.

The burner modules are preferably designed in such a way that they can easily be manufactured using the powder bed fusion process (PBF, metal powder 3D printing) without additional support structures which must be removed. Machining is thus largely dispensed with.

Additive manufacture allows a cost calculation within a few minutes and a corresponding manufacture within a few days.

In particular, the present invention achieves the following advantages:

Reduction in production costs: The costs for a modular burner can be reduced by about 50% thanks to the redesign and the additive or generative manufacture.

Reduction in the design effort: A design of a new modular burner is possible in approximately half a man-day rather than in approximately 3-4 man-days, as a result of which the overall costs of the burner can be reduced by approximately 75%.

Accelerated quoting times: Thanks to the optimized design and the rapid calculation of this additively designed and manufactured burner module, a customer can now be provided with a project quote within a maximum of one week, which would take much longer with a conventional burner design.

Simple replacement part delivery since in the case of damage, an exactly identical modular burner can be manufactured and delivered within a few days. This is possible independently of special suppliers needed for a conventional complex distributor block.

Such a burner module for a modular burner can be produced from appropriate materials suitable for additive manufacture, such as brass, bronze, Inconel, titanium, tungsten, copper, heat-resistant steel, various stainless steels, and ceramics. This can be provided in particular in the nozzle region in order to make one or more nozzles more temperature-resistant, wherein a more inexpensive material can be used for the module body.

For example, pairings of tungsten, copper, Inconel, stainless steel, and/or titanium are possible as material combinations.

Furthermore, at least one of these functional walls can be connected at least in regions to a region of a complementary functional wall of a further burner module. In the context of the present invention, the term "complementary" is understood to mean a shape or a design of the functional wall which permits a gas-tight connection of one or more functional walls or else partial regions thereof. Preferably, a modular burner formed from such burner modules is manufactured additively in one piece or as a whole.

The functional walls can have multiple edges, such as in each case two side edges, an upper edge, and a lower edge, which are designed as virtual edges or continuous edges or as edge sections. This means that the functional walls can have virtually any desired shape as viewed from an end face. The edges can have a rectangular or polygonal or oval shape or can also be cross-shaped or the like.

The nozzle opening can itself form one or more burner nozzles and/or openings for air showers and/or one or more nozzles for a self-igniting burner or else be designed as a nozzle receiving opening for receiving a separately manufactured nozzle.

In the context of the present invention, an air shower is understood to mean a feed of air or oxygen in the nozzle region in the region of a fuel gas nozzle, in order to provide centrally molded fuel gas nozzles with oxygen for the combustion process, in particular in an array of burner modules.

In the context of the present invention, a nozzle for a self-igniting burner is understood to mean a nozzle in the nozzle region directed in the direction of a fuel gas nozzle of an adjacent burner module in order to enable cascaded ignition of the burner modules.

The burner module can be triangular, quadrilateral, pentagonal, hexagonal, heptagonal, octagonal, or polygonal, or round when viewed from above, or can have another suitable shape which makes it possible to arrange multiple burner modules next to one another and in particular in an array or to connect them to one another. Corresponding suitable geometries and shapes are also known from the laying patterns in the field of tiles.

The module body can have at least three or four or five or six functional passage openings, wherein at least two of these functional passage openings are connected to one another communicatively via a second functional space, and wherein the second functional space is spatially separated from the first functional space so that the second functional space forms a cooling chamber, for example, wherein a suitable cooling medium, such as water, can be fed to the cooling chamber or the second functional space via the functional passage openings.

The second functional space can additionally and/or alternatively be connected communicatively via a functional channel to one or more functional openings formed in the upper wall in order to form an air shower.

Air or oxygen, for example, can thus be additionally fed to the fuel gas mixture via the functional channel, or a corresponding cooling medium can be supplied to the nozzle.

The module body can have at least three or four or five or six further passage openings, wherein at least two of these passage openings are connected to one another via the first or the second functional space in order to form a mixing chamber in the first or the second functional space, or wherein at least two of these passage openings are connected to one another communicatively via a further functional space, wherein the further functional space is spatially separated from the first and the second functional space and is optionally connected communicatively via a channel to a further opening of the nozzle device formed in the upper wall.

Accordingly, at least two different passage openings formed in a functional wall can open into the same functional space in order to form a mixing chamber. In this mixing chamber, a fuel gas can be mixed with air to form a fuel gas mixture.

Thus, in the nozzle region, the burner module can have one or more self-igniting auxiliary burner nozzles and/or air showers and/or one or more further functional spaces, which are preferably arranged one above the other in multiple planes in order to form a mixing chamber or a cooling chamber.

It is possible for the burner module to be approximately cylindrical or to form a bent burner head.

The shape of the nozzle opening is also variable; instead of dedicated holes, for example, a porous surface can therefore be printed which, similarly to a sintered stone, produces a homogeneous flame blanket. This porous surface can be cooled by means of integrated cooling channels in order not to damage it.

According to the invention, two, three, or four or five functional spaces can be provided with corresponding passage openings in different planes arranged one above the other in the vertical direction in a burner module or in a modular burner.

According to the invention, a modular burner is thus provided, comprising at least two and preferably a plurality of the above-described burner modules, which are connected to one another in the region of their functional walls to form a burner module array, wherein the entire burner module array is manufactured additively in one piece, and wherein burner modules arranged peripherally correspondingly have one or more closed sidewalls.

Furthermore, a feed device can be provided for feeding one or more media, such as a fuel gas mixture, fuel gas, a cooling medium, air, and/or oxygen.

The advantages indicated above on the basis of the burner module apply analogously to the modular burner according to the invention formed from a plurality of burner modules.

A method for the additive manufacture of a three-dimensional burner module or a modular burner, comprising the following steps:
providing a starting material,
melting the starting material using a heat source to form a component layer, repeating the above steps.

The method according to the invention is characterized in that a burner module described above or a modular burner described above is formed by the plurality of component layers.

Furthermore, it can be provided for different starting materials to be used in different layers and/or in different regions of the burner module in one and/or in multiple steps.

During the method, a process gas and/or a functional gas can be supplied in order to improve the component properties.

Furthermore, during the additive manufacture, the temperature of the starting material and/or the process gas can be adjusted, i.e., the starting material and/or process gas can be cooled and/or heated, and/or a stabilizing step can be provided in which a layer is cooled and solidified.

Pores can be formed in the nozzle region in the burner module in order to form a nozzle surface or so that this region has membrane-like properties for discharging gases.

Since it is provided according to the invention for the burner module to be produced by means of an additive manufacturing method, it is possible to provide geometries of any desired complexity.

Within the scope of the present invention, additive manufacture is understood to mean the construction of a three-dimensional component ply-by-ply or layer-by-layer using a powder bed, a powder feed, or a wire feed, which serve as starting material and are melted by means of a laser beam, an electron beam, or a plasma or an arc. In this respect, reference is made to the additive manufacturing methods mentioned in the introduction of the description (3D printing or in the solidification by chemical activators, melting and solidification (laser engineered net shaping (LENS), as direct metal deposition (DMD) or as laser additive manufacturing (LAM)), local sintering or melting (laser sintering (SLS)), metal laser sintering (DMLS), metal laser sintering (IMLS), electron beam melting (EBM)).

In additive manufacturing methods, heat or energy sources are usually used which introduce energy at a specific point of a layer or ply of a component to be produced. This energy introduced during the production process remains in the component to be constructed and increases its temperature. As explained above, this excess heat in the component is usually disadvantageous and has negative influences on the material properties. In addition, the excess heat which is not dissipated from the component has a negative influence on the production process itself. This leads to process instabilities and reduced reproducibility.

The step in which the pores are formed in at least one component layer can be carried out by additive manufacturing in such a way that only some of the starting material is completely melted and the corresponding pores are formed in a region of the starting material which is not completely melted.

Additionally and/or alternatively, the formation of the pores can also be carried out in additive manufacturing in such a way that defects are provided in the material during additive manufacturing in order to form the pores.

Furthermore, the pores can additionally and/or alternatively be formed in at least one component layer by performing an additional chemical treatment of a layer as an intermediate step during the manufacture and/or after completion of the additive manufacturing steps as an aftertreatment in such a way that the material is dissolved and/or rinsed out in order to form the pores.

Provision can also be made for the pores in the component to be provided as structural elements. This means that the pores are created in the CAD model and then correspondingly formed during additive manufacturing. The size of the pores can then be set in virtually any way, the only limitation being the minimum layer thickness which can be produced by the additive manufacturing method.

The formation of the pores can be influenced by the setting of the process parameters, such as the selection of the starting materials and/or the temperature in a process chamber and/or the temperature of the heat source for melting the starting material and/or the selection of a corresponding process gas.

The process gas can comprise an inert gas, such as argon, helium, neon, krypton, xenon, or radon, or an active gas, such as hydrogen ($H_2$), carbon monoxide (CO), silane, oxygen ($O_2$), carbon dioxide ($CO_2$), nitrogen ($N_2$), or else mixtures thereof with or without reducing or oxidizing components. Accordingly, a shielding gas, such as a shielding gas supplied in the region of the nozzle in the case of a laser or arc method, is also understood to mean a process gas within the meaning of the present invention.

Figure 3:
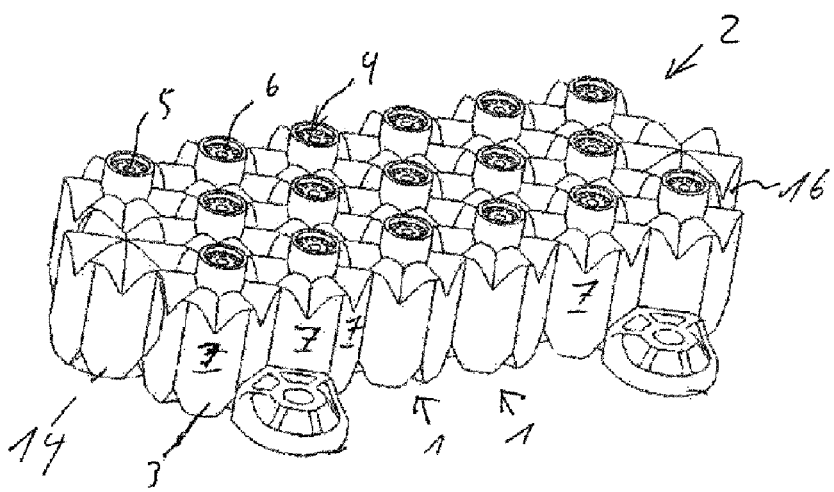

The present invention is described in more detail below with reference to an exemplary embodiment shown in the figures. In the figures, FIG. 1 shows a burner module according to the invention for a modular burner in a perspective diagram, and FIG. 2 shows the burner module from FIG. 1 in a further perspective diagram, and FIG. 3 shows a modular burner according to the invention, which comprises a plurality of burner modules, in a perspective diagram.

An exemplary embodiment of a burner module 1 according to the invention for a modular burner 2 according to the invention (FIGS. 1 and 2) is described below.

The burner module 1 comprises a module body 3 and a nozzle device 4. In the present exemplary embodiment, the nozzle device 4 has a centrally arranged fuel gas opening 5 and nine support burner openings 6 concentrically surrounding the fuel gas opening.

The module body 3 has six sidewalls, which are referred to as functional walls 7.

According to this exemplary embodiment, the burner module 1 is hexagonal when viewed from above.

Each of the functional walls 7 delimits two regions 8 of two different functional passage openings 9 and a gas passage opening 10.

Accordingly, two adjacent functional walls 7 of a burner module 1 together with two further functional walls 7, connected thereto, of two further burner modules 1 form the functional passage opening 9.

It is also possible within the scope of the present invention for a functional wall to delimit only regions of a gas passage opening 10 or an entire functional passage opening 9.

The gas passage openings 10 open into a first functional space 11 which is formed in the module body 3 and via which the gas passage openings 10 are connected to one another communicatively.

The first functional space 11 is connected to the fuel gas opening 5 via a gas channel 12 extending in the vertical direction.

Fuel gas can be supplied to the fuel gas opening or fuel gas nozzle 5 via the gas passage openings 10 and the gas channel 12.

The functional passage openings 9 open into a second functional space 13 which is formed in the module body 3 and via which the functional passage openings 9 are connected to one another communicatively.

The second functional space 13 forms a cooling chamber, and a cooling medium, for example water, can be supplied to it via the functional passage openings 9 in order to cool the module body 3 and in particular the nozzle region 4.

Alternatively, the second functional space 13 can be connected to openings in the nozzle region via a second functional channel 14 arranged concentrically with the gas channel 12 and extending in the vertical direction (not shown).

Air can be supplied to the air openings via the functional passage openings 9 and the functional channel 14 in order to form an air shower.

The functional walls 7 each have two side edges, an upper edge, and a lower edge, which are designed as virtual edges or continuous edges or as edge sections.

The burner module 1 according to the invention can also be triangular, quadrilateral, pentagonal, or polygonal when viewed from above and have a corresponding number of functional walls.

In the present exemplary embodiment, the modular burner 2 according to the invention comprises seventeen burner modules 1 which are connected to one another via their functional walls and form a burner module array (FIG. 3).

The peripheral functional walls are correspondingly closed.

Furthermore, one or more feed devices for feeding one or more media, such as water, air, oxygen, fuel gas, and/or fuel gas mixture, are provided.

According to this exemplary embodiment, a fuel gas mixture is fed to the gas passage openings 10 via a feed opening 15 which is formed in a bottom wall of a burner module 1 of the modular burner 3.

A cooling medium is fed via a cooling medium feed device 14 to the functional passage openings 9 and discharged therefrom by means of a cooling medium discharge device 16.

The method according to the invention for the additive manufacture of a burner module or a modular burner is described below by way of example. As already explained above, virtually any additive manufacturing method is in principle suitable for forming the three-dimensional burner module.

However, the method is explained below with reference to the laser melting process with powder bed by way of example.

In a first step, a metallic starting material is applied to a building platform in the form of a powder bed by means of a coating device.

As explained above, a starting material made of ceramic can also be provided instead of a metallic starting material. In the case of a metallic starting material, this can also be provided by means of a powder feed or a wire feed or in the form of filaments.

In a next step, a process gas is fed to the process chamber. In the present case, an inert shielding gas, such as nitrogen, is provided by way of example.

In the subsequent step, the starting material is melted by means of a heat source, such as a laser.

As a rule, the cooling of a layer takes place while the laser melts material elsewhere or even when a new powder layer is applied.

Additionally and/or alternatively, provision can also be made according to the above-described method for a layer of metal particles of different properties to be provided. This means that in the present case the metal powder or its particles have a different material composition at the surface than in the interior, but the same also applies to a wire or filaments. Such properties can be, for example, by means of a corresponding coating or a relatively simple modification, for example by means of an oxide layer or nitride layer applied correspondingly to the particles.

These steps are then repeated to provide a burner module or modular burner with a geometry of any desired complexity.

According to the invention, two, three, or four or five functional spaces can be provided with corresponding passage openings in different planes arranged one above the other in the vertical direction in a burner module or in a modular burner.

LIST OF REFERENCE SIGNS

1 Burner module
2 Modular burner
3 Module body
4 Nozzle device
5 Fuel gas opening
6 Support burner opening
7 Functional wall
8 Region
9 Functional passage opening
10 Gas passage opening
11 First functional space
12 Gas channel
13 Second functional space
14 Cooling medium feed device
15 Feed opening
16 Cooling medium discharge device

The invention claimed is:

1. A burner module for a modular burner, comprising:
at least three functional walls which delimit at least one first functional space and form a module body,
wherein the module body has at least three gas passage openings formed in the functional walls, and at least two of these gas passage openings are connected to one another communicatively via the at least one first functional space, and
wherein at least one nozzle device having a fuel gas opening is formed in an upper wall of the burner module, which fuel gas opening is connected communicatively to the first functional space via a gas channel, and wherein the burner module is manufactured in an additive manner.

2. The burner module according to claim 1, wherein the module body has at least three functional passage openings, and at least two of these functional passage openings are connected to one another communicatively via a second functional space, wherein the second functional space is spatially separated from the first functional space.

3. The burner module according to claim 2, wherein the second functional space is connected communicatively via a functional channel to a further opening of the nozzle device formed in the upper wall in order to form an air shower.

4. The burner module according to claim 1, wherein the module body has at least three further passage openings,
wherein at least two of these further passage openings are connected to one another via the first functional space or the second functional space in order to form a mixing chamber in the first functional space or the second functional space, or
wherein at least two of these further passage openings are connected to one another communicatively via a further functional space, wherein the further functional space is spatially separated from the first and the second functional space and is optionally connected communicatively via a channel to a further opening of the nozzle device formed in the upper wall.

5. The burner module according to claim 1, wherein the gas passage openings are formed completely or in regions in the functional walls, and wherein, when the gas passage openings are formed in regions in the functional walls, they are then formed by two adjacent functional walls.

6. The burner module according to claim 1, wherein the burner module is triangular, quadrilateral, pentagonal, hexagonal, heptagonal, octagonal, or polygonal or approximately round when viewed from above.

7. A modular burner comprising a plurality of burner modules according to claim 1, which are connected to one another in a region of their functional walls to form a burner module array, wherein the burner module array is manufactured additively in one piece, and wherein burner modules arranged peripherally have one or more closed sidewalls.

8. The modular burner according to claim 7, wherein at least one feed device is provided for feeding one or more media.

9. A method for the additive manufacture of a three-dimensional burner module or a modular burner, comprising the following steps: providing a starting material, melting the starting material using a heat source to form a component layer, repeating the above steps, wherein a burner module according to claim 1 is formed by the plurality of component layers.

10. The method according to claim 9, wherein different starting materials are used in different layers and/or in different regions in one or in multiple steps.

11. The burner module according to claim 2, wherein the functional passage openings are formed completely or in regions in the functional walls, and wherein when the functional passage openings are formed in regions in the functional walls, they are then formed by two adjacent functional walls.

12. The burner module according to claim 2, wherein the gas passage openings and/or the functional passage openings are formed completely or in regions in the functional walls, and wherein, when the gas passage openings and/or the functional passage openings are formed in regions in the functional walls, they are then formed by two adjacent functional walls.

13. The method according to claim 9, wherein different starting materials are used in different layers and/or in the nozzle region of the burner module in one or in multiple steps.

* * * * *